T. J. POWERS.
Machine for Making Cartridge Cases.
No. 54,255. Patented April 24, 1866.
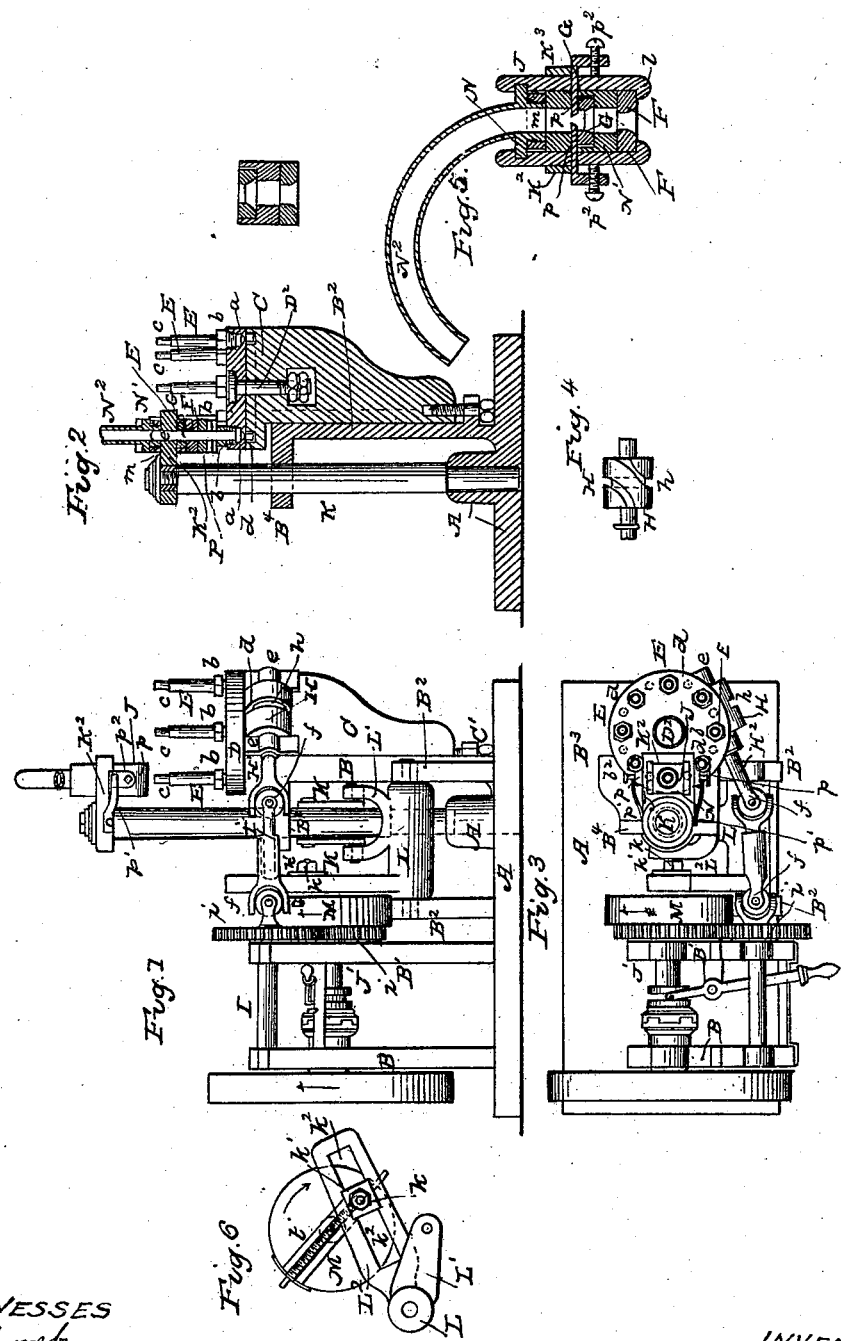

UNITED STATES PATENT OFFICE.

TIMOTHY J. POWERS, OF NEW YORK, N. Y., ASSIGNOR TO J. P. FITCH AND J. R. VAN VECHTEN, OF SAME PLACE.

IMPROVED MACHINE FOR MAKING CARTRIDGE-CASES.

Specification forming part of Letters Patent No. 54,255, dated April 24, 1866.

*To all whom it may concern:*

Be it known that I, TIMOTHY J. POWERS, of the city, county, and State of New York, have invented a new and Improved Machine for Drawing and Cutting off the Ends of Metallic Cartridge Shells and other Metallic Articles of Similar Character; and I do hereby declare that the following is a full, clear, and exact description of the same, reference being had to the accompanying drawings, forming part of this specification, in which—

Figure 1 is a side elevation of the machine. Fig. 2 is a central vertical section of the principal working parts of the same parallel with Fig. 1. Fig. 3 is a plan of the same. Fig. 4 is a side view of the cam, by which the intermittent rotary motion of the table which carries the drawing-mandrels is effected. Fig. 5 is a central vertical section of the drawing-dies at right angles to Fig. 1, on a larger scale than Figs. 1, 2, 3, and 4. Fig. 6 is a detail view, which will be hereinafter explained.

Similar letters of reference indicate corresponding parts in the several figures.

The principal elements of this machine are a series of mandrels arranged in a circle upon an intermittently-rotating table perpendicular to the axis of its rotation, and a reciprocating die or set of dies operating in combination therewith, the said mandrels and die being constructed to draw the shells to the required size, length, and thickness, and also to cut off the waste metal from their ends, and being arranged to get rid of the waste so cut off.

By the machine so organized I perform at one operation the duty commonly requiring five machines, three drawing operations and two cutting-off and burring operations being required for drawing and cutting off the waste metal from the ends of the shells in the ordinary system of manufacturing shells for metallic cartriges, and the shells requiring to be annealed usually more than once.

To enable others skilled in the art to make and use my invention, I will proceed to describe its construction and operation.

A is a bed-plate, upon which are erected the standards B B' B² B³ B⁴, which support, sustain, or guide the operations of the several working parts of the machine.

C is the vertical support of the intermittently-rotating table D, which carries the upright mandrels E E. This support C is fitted into a vertical dovetail slide in the front standard, B³, and supported by a set-screw, C', which screws into a tapped hole in the bottom and rests upon the bed-plate A, the said screw serving also to adjust the support C, the table, and the mandrels in a vertical direction, to provide for the drawing of shells of different lengths in the same machine by the use of suitable mandrels. The table D is secured to the support C' by a central pin, D², about which the said table is capable of rotating freely.

The mandrels are arranged with their operating ends upward, at equal distances apart, in a circle concentric with the axis of the central pin, D², and are secured in the table by being provided at their lower ends with fixed collars $a$ $a$, which are fitted into holes bored partly through the table for their reception, and by screwing down upon the said collars $a$ $a$ hollow movable collars $b$ $b$, which slip over the mandrels from their upper ends and screw into female screw-threads cut into said holes. This mode of securing the mandrels in the table provides for their easy removal and replacement in case of damage.

The said mandrels are made with shoulders $c$ $c$, all round. The parts of the said mandrels above these shoulders are exactly of the form, length, and diameter to which the interiors of the cartridge-shells are to be drawn, and the parts below these shoulders of a diameter equal to that required for the exteriors of the drawn-shells, or so little smaller as to allow the finishing drawing-die to slip easily over. The shoulders $c$ $c$ are made with sharp edges.

The intermittently-rotating movement of the table D, by which the mandrels are brought one at a time under the reciprocating dies F and G, is produced by the action of a grooved cylindrical cam, H, upon a number of pins, $d$ $d$, projecting from the under side of the table, the said pins corresponding in number with the mandrels, and being arranged, at equal distances apart, in a circle concentric with the axis of the table. The cam H is secured to a shaft, H', which works in bearings $e$ $e$, secured to the support C, and which is connected by an intermediate shaft, I', and two universal joints, $i$ $i$, with a shaft, I, which works in bearings in the standards B B', and which derives motion through a pair of spur-gears, $f$ $f$, from the main shaft J' of the machine. The intermediate shaft, I', is made in two pieces, one of which slides into the other with a groove and pin, and by this construction and the universal-joint connections provision is made for the raising and lowering of the support C and table D, the universal joints also providing for the transmission of the motion from I to H in an oblique direction, the shaft H being oblique to I. The groove $h$ of the cam H extends around, about two-thirds of the circumference of the cam, at the middle of its length, in a direction parallel to its plane of revolution, and thence in oblique directions to both ends of the cam, as shown in Fig. 4, and the cam is of such length that one of the pins $d$ of the table D will enter it at one end just as the next one of the said pins is leaving it at the other end. The movement of the table is produced by the oblique portions of the groove of the cam, and the portion of the groove which is parallel with the plane of revolution holds the table stationary, the pins $d$ $d$ fitting snugly to the groove. Every movement of the table carries one mandrel away from the dies and brings another one opposite them.

The dies F G are attached, by means of two gib-plates, J J, to the head $K^2$ of an upright plunger, K, which works in a fixed guide, $B^4$, attached to the standard $B^3$, and another guide, A', on the bed-plate A. This plunger is connected, by two rods, K' K', on opposite sides, with the forked arm L' of a horizontal rock-shaft, L, which works in bearings in the two standards $B^2$ $B^2$, and which is furnished with a slotted arm, $L^2$, in the slot $k^2$ of which there is a sliding box, $k'$, which receives the crank or eccentric wrist $k$, which is carried by a disk, M, secured to one end of the main shaft. Fig. 6 is a front view of the disk M, the crank-wrist, and the rock-shaft.

The rock-shaft and its arms constitute a lever through which the crank-wrist $k$, by its revolution, produces an upward and downward movement of the plunger K and dies. The movement of the wrist and its sliding box $k'$ in the slot of the arm $L^2$ is such that during about one-quarter of each revolution of the disk, while the dies are raised entirely above the mandrels, and the movement of the table D to present a new mandrel under the dies is taking place, the movement of the rock-shaft, the plunger K, and the dies are almost suspended; and another important feature of this movement is that it produces a slow downward movement of the die when great power is required to effect the drawing of the cups, and a rapid upward movement when the resistance is very slight.

The wrist $k$ is fitted into a slot, $t$, in the disk M, in which it is adjustable nearer to or farther from the shaft J' by means of a screw, $t'$, for the purpose of varying the stroke of the plunger K and dies according to the length of the shells to be drawn. In order to make this adjustment effective, the support C requires to be vertically adjustable, as hereinbefore described.

The lower die, F, which is intended to perform a preparatory drawing operation, fits between the gib-plates J J, and rests directly upon the lugs $l$ $l$ thereof, as shown in Fig. 5, and the upper die, G, which finishes the drawing operation, is placed in a die-box, N, which rests upon the die F, and which fits between the gib-plates. The gib-plates are fitted to slots in the head $K^2$ of the plunger K, and above the said plate they have horizontal dovetail grooves in their inner faces for the reception of the edges of a plate, N', on the bottom of which there is a screw, to which is fitted a nut, $m$, which, by being screwed down upon the head $K^2$, draws up the gib-plates and makes them clamp the die F and die-box N firmly under the head $K^2$. The die-box N is fitted to the lower die with steady-pins $n$ $n$, in order to keep the dies opposite each other. In order, however, to permit the upper die to adjust itself in some degree to the lower one, it is fitted quite loosely into the box. The dies are, or may be, of the ordinary form of drawing-dies, having simply a cylindrical aperture with a taper or flaring mouth, for the easy entrance of the shell or other article to be drawn.

The aperture of the upper die, G, is of the diameter which the exterior of the shell is to have when finished, and the aperture of the lower one slightly larger.

There is provided in the head $K^2$ of the plunger, over the dies, a hole, $s$, large enough for the drawn shells to pass freely through, and a similar hole is provided in the plate N' for the escape of the drawn shells as they are stripped off from the mandrels by means of a pair of strippers, $p$ $p$, which are fitted to slide in dovetail grooves in the bottom of the head $K^2$, and which pass through slots in the gib-plates. These strippers are pressed inward by means of springs $p'$ $p'$, Figs. 1 and 3, attached to the head $K^2$ of the plunger, and pressing against their outer ends, and the distance which they are allowed to move inward is regulated by set-screws $p^2$ $p^2$, screwed through lugs at their outer ends and coming in contact with the gib-plates. The inner ends of the strippers are beveled on the under sides to sharp edges, which are made of such concave form as to fit the mandrel, the beveled edges allowing the mandrel and shell to push them aside and pass between them as the plunger K descends.

The plate N' has attached to it a curved tube, $N^2$, through which the shells, after having been drawn and had their ends cut off, are discharged from the machine into a suitable receptacle.

The operation of the machine is as follows: The machine being set in motion by power applied to the main shaft J, the cartridge-shells or other articles to be drawn having been cupped in another machine or by other suitable means to a diameter somewhat larger internally, to a depth or length somewhat less, and to a thickness somewhat greater than they are desired to be when finished, are placed, one at a time, upon the mandrels E E by an attendant, who stands in front of the machine. As each mandrel is brought, by the intermittent rotation of the table D, under the dies F G, the table stops and the dies are brought down over the mandrel and the shell which has been placed thereon. The lower and larger die, F, first draws the shell over the end of the mandrel nearly to the required thickness and length, and the drawing is completed by the upper and smaller die.

As the drawing operation cannot produce an even edge on the shell the edge requires trimming, and in order to provide for this trimming a slight extra quantity of metal is used in the blanks of which the shells are made beyond what is necessary to produce the shell. This slight extra quantity of metal is drawn by the upper die, G, over the sharp edge of the shoulder c of the mandrel, which serves as a cutter and cuts off all that is so drawn over it, leaving the shell with an even edge.

As the dies rise the strippers p p strip off the shell which remains in the hole s until another shell has been drawn over and stripped from the next mandrel, and the last shell pushes up that previously left in the hole s. In this way the shells are pushed up into the tube $N^2$ and discharged therefrom.

The waste metal cut from the edge of one shell is pushed down on that part of the mandrel below the shoulder c by the superfluous metal of the next shell drawn upon the same mandrel, and the waste pieces accumulating upon the lower parts of the mandrel in the form of rings or parts of rings are torn open, so that they may fall from the mandrels. To insure the better liberation of the waste pieces from the mandrels the lower parts of the latter may be furnished with cutters so arranged as to split the pieces.

I will here remark that two dies are not absolutely essential to the successful operation of the machine, as the entire drawing may be effected by one die, which will also operate in combination with the edges of the shoulders c of the mandrels to make the said edges cut off the waste metal from the edges of the shell.

Among the many advantages of this machine, as compared with others used for similar purposes, the following may be mentioned as of especial importance:

First, by the use of several mandrels in combination with a single die or set of dies the heating and expansion of the mandrels to an injurious degree are prevented, as the intervals between the successive operations of the mandrels are sufficient to allow them to cool after the slight heating to which they are subjected by a single operation. The heating of the mandrels is found in machines of this character to be a very serious obstacle to the perfect working of the machine, for it not only expands the mandrels, and so, by reducing the space between them and the die, renders the shells liable to be torn by being drawn too thin, but it causes the surfaces of the mandrels to be injured in the drawing operation and produces the tearing of the shells by that means. A single die can be used with several mandrels without any such injurious effects, for the worst effect that can result from the heating and consequent expansion of the die is to make it draw the shells a little too thick.

Second, by constructing the mandrels with cutting-shoulders c to cut off the waste metal from the edges of the shells the use of a separate machine for that purpose is obviated.

Third, by arranging the mandrels with their points upward, instead of with the points downward or in a horizontal position, as in other drawing-machines, greater facility is afforded for feeding the machine, as the undrawn shells, being larger than the mandrels, can be dropped easily over the tops of the latter, and will center themselves thereon by gravitation, thus obviating the difficulty of placing the shells upright in a die. Another advantage of arranging the mandrels with their points upward is that the waste or scrap cut from the shells is prevented from getting into the dies and interfering with the drawing operation in such manner as to spoil the next shell. Another advantage of this arrangement is that it provides for introducing the shells centrally into the die with greater certainty than by any other arrangement.

Fourth, by providing for varying the length of stroke of the dies the main shaft is enabled to be run at a velocity corresponding with the length of the shells to be drawn, or, in other words, to be run at a higher velocity for drawing shorter shells without increasing the velocity of the movement of the dies over the mandrels.

Having thus described my invention, I will proceed to state what I claim as new and desire to secure by Letters Patent—

1. In a machine for drawing metallic cartridge-shells or other similar articles of metal, the employment of several mandrels operating successively or in rotation in combination with one die or set of dies, substantially as and for the purpose herein described.

2. The arrangement of the mandrel or mandrels in a machine for drawing cartridge-shells or other similar articles in an upright position, with the point upward, substantially as and for the purpose herein specified.

3. The construction of a mandrel on which cartridge-shells or other similar articles are to be drawn with a shoulder, c, having a sharp cutting-edge, operating substantially as herein described, in combination with the drawing die or dies to cut off the waste metal from the edges of the shell or other article after the drawing operation is completed, substantially as herein set forth.

4. The cylindrical cam H, having a groove, $h$, of the form herein described, operating in combination with a series of pins, $d\ d$, in the table D, which carries the drawing-mandrels, to produce the intermittent rotary movement of the said table, and to lock the table in fixed positions during the intermission in its rotary movement, substantially as herein set forth.

T. J. POWERS.

Witnesses:
    J. W. COOMBS,
    G. W. REED.